(12) United States Patent
Seol et al.

(10) Patent No.: US 11,457,104 B2
(45) Date of Patent: Sep. 27, 2022

(54) MOBILE TERMINAL INCLUDING FLEXIBLE DISPLAY

(71) Applicant: LG ELECTRONICS INC., Seoul (KR)

(72) Inventors: Seounghwan Seol, Seoul (KR); Hakho Choi, Seoul (KR); Sangwook Park, Seoul (KR); Donghwan Lim, Seoul (KR); Sungdo Kim, Seoul (KR); Junhong Kang, Seoul (KR); Ara Kim, Seoul (KR); Sungsu Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 17/213,106

(22) Filed: Mar. 25, 2021

(65) Prior Publication Data

US 2022/0166865 A1    May 26, 2022

(30) Foreign Application Priority Data

Nov. 26, 2020 (KR) ................. PCT/KR2020/016947

(51) Int. Cl.
*H04M 1/02* (2006.01)
(52) U.S. Cl.
CPC ....... *H04M 1/0268* (2013.01); *H04M 1/0249* (2013.01)
(58) Field of Classification Search
CPC ................... H04M 1/0268; H04M 1/0249
See application file for complete search history.

(56) References Cited

U.S. PATENT DOCUMENTS

| | | | |
|---|---|---|---|
| 2016/0147261 A1* | 5/2016 | Bohn | H04B 1/3833 455/566 |
| 2018/0188778 A1* | 7/2018 | Shin | G06F 1/1652 |
| 2019/0268455 A1* | 8/2019 | Baek | G06F 1/1652 |
| 2020/0264660 A1 | 8/2020 | Song et al. | |
| 2020/0329572 A1* | 10/2020 | Wittenberg | H05K 5/0017 |
| 2021/0181800 A1* | 6/2021 | Ko | G06F 1/1624 |

FOREIGN PATENT DOCUMENTS

| | | |
|---|---|---|
| KR | 1020100058416 | 6/2010 |
| KR | 1020160141255 | 12/2016 |
| KR | 1020170081559 | 7/2017 |
| KR | 1020190113128 | 10/2019 |
| KR | 1020200111083 | 9/2020 |

OTHER PUBLICATIONS

PCT International Application No. PCT/KR2020/016947, International Search Report dated Aug. 23, 2021, 10 pages.

\* cited by examiner

*Primary Examiner* — Yuwen Pan
*Assistant Examiner* — Angelica M Perez
(74) *Attorney, Agent, or Firm* — Lee, Hong, Degerman, Kang & Waimey PC

(57) ABSTRACT

A mobile terminal comprises a body including a first frame and a second frame slidably coupled to a rear surface of the first frame in a first direction or a second direction; a flexible display unit including a front portion located on a front surface of the body, a rear portion located on a rear surface of the body, and a side portion connecting the front portion with the rear portion and surrounding one side of the body; a plurality of reinforcing ribs protruded from a rear surface of the first frame and extended in the first direction; and a plurality of supports protruded from a front surface of the second frame and located between the respective reinforcing ribs. The mobile terminal may enhance usability and portability by varying its size.

19 Claims, 14 Drawing Sheets

(a)

(b)

(a)

(b)

(a)

(b)

(a)

(b)

(a)

(b)

(c)

(a)

(b)

(a)

(b)

(c)

(a)

(b)

(c)

(d)

MOBILE TERMINAL INCLUDING FLEXIBLE DISPLAY

CROSS-REFERENCE TO RELATED APPLICATION(S)

Pursuant to 35 U.S.C. § 119 (a), this application claims the benefit of an earlier filing date and right of priority to International Application No. PCT/KR2020/016947 filed on Nov. 26, 2020, the contents of which are hereby incorporated by reference herein in its entirety.

BACKGROUND OF THE INVENTION

Field of the Invention

The present disclosure relates to a mobile terminal, and more particularly, to a mobile terminal that has a flexible display and is capable of extending a size of a screen while the display is scrolled and slid at the same time.

Discussion of the Related Art

Terminals may be generally classified as mobile/portable terminals or stationary terminals according to their mobility. Mobile terminals may also be classified as handheld terminals or vehicle mounted terminals according to whether or not a user can directly carry the terminal.

In recent years, because of a development of a broadcasting technology and a network technology, functions of the display device have also been considerably diversified, and a performance of the device has been improved accordingly. That is, the display device has been developed to provide not only broadcast contents but also various other contents to the user. For example, the display device may provide game play, music listening, internet shopping, user customized information, and the like using various applications as well as programs received from the broadcasting station. In order to perform such extended functions, the display device may be basically connected to other devices or networks using various communication protocols, and may provide the user with a ubiquitous computing environment. In other words, the display device has evolved into a smart device that enables connectivity to a network and continuous computing.

Recently, a flexible display having sufficient elasticity and capable of large deformation has been developed. The size of a mobile terminal can be varied using the deformable nature of the flexible display. For the mobile terminal having such a variable structure, changing the size of the mobile terminal should be stably performed, and there is a need for a structure to support the extended display unit to maintain a flat state of the display unit.

Also, components exposed to the outside need to be minimized to prevent any contaminant from entering the inside due to the variable structure.

SUMMARY OF THE INVENTION

Accordingly, the present disclosure is directed to a mobile terminal that substantially obviates one or more problems due to limitations and disadvantages of the related art.

An object of the present disclosure is to provide a mobile terminal for improving the durability of a flexible display by preventing a point at which the flexible display is bent from being limited to a specific position.

To achieve these objects and other advantages and in accordance with the purpose of the invention, as embodied and broadly described herein, a mobile terminal comprises a body including a first frame and a second frame slidably coupled to a rear surface of the first frame in a first direction or a second direction; a flexible display unit including a front portion located on a front surface of the body, a rear portion located on a rear surface of the body, and a side portion connecting the front portion with the rear portion and surrounding one side of the body; a plurality of reinforcing ribs protruded from a rear surface of the first frame and extended in the first direction; and a plurality of supports protruded from a front surface of the second frame and located between the respective reinforcing ribs.

Each support may have a protruding height corresponding to that of each reinforcing rib.

Each reinforcing rib may include a rib protrusion protruded in a third direction vertical to the first direction, each support may include a rib groove inserted to correspond to a shape of the rib protrusion, and the rib protrusion and the rib groove guide movement of the first frame in the first direction and the second direction with respect to the second frame and limits movement of the first frame in the third direction.

The rib protrusion and the rib groove may further include a low friction layer on their surfaces.

The flexible display unit may include a first area coupled to the front surface of the first frame; and a second area of which position is variable to the front surface or the rear surface of the body when a size of the body is changed, and a rolling hinge is located on a rear surface of the second area and enables bending deformation to correspond to a shape of the second area, and its thickness and a thickness of the support may correspond to those of the first frame and the reinforcing rib.

The rolling hinge may include a plurality of support bars extended in the third direction vertical to the first direction and disposed in parallel with one another in the first direction, and an interval between the support bars may be widened as the support bars are far away from a rear direction of the flexible display unit.

The mobile terminal may further comprise a driving unit moving the first frame in the first direction or the second direction with respect to the second frame to adjust the size of the body, wherein the driving unit may include a motor packaged in the second frame; a pinion gear rotated by a driving force of the motor; and a rack gear located on the rear surface of the first frame and extended in the first direction, making linear movement by the driving force of the motor, which is delivered through the pinion gear.

The mobile terminal may further comprise a motor housing configured to seat the motor and the pinion gear thereon and fastened to the second frame; and a guide rail fastened to the rack gear, guiding linear movement of the rack gear.

The mobile terminal may further comprise a rail bearing located between the guide rail and the rack gear.

The driving unit may include a plurality of motors disposed in parallel with one another in the first direction; and a plurality of pinion gears fastened to the plurality of motors, providing the driving force to the rack gear.

The driving unit may include a plurality of driving units disposed to be spaced apart from one another in the third direction vertical to the first direction.

The mobile terminal may further comprise a slide frame slidably coupled on the rear surface of the second frame in the first direction or the second direction, wherein an end portion of the flexible display unit is fixed to a rear surface of the slide frame.

The mobile terminal may further comprise a first edge deco fixing the end portion of the flexible display unit in the second direction to the first frame.

The mobile terminal may further comprise a side frame protecting the side portion of the flexible display unit.

The mobile terminal may further comprise a rear cover covering a rear surface of the second frame and including a light-transmissive material.

As described above, the mobile terminal of the present disclosure may enhance usability and portability by varying its size.

Also, since a curved portion of the flexible display is not limited to a specific portion, stress only applied to the specific portion may be distributed when a size of the mobile terminal is changed.

Also, since a display unit may stably be maintained at a flat state even in the case that mobile terminal is extended, a continuous large screen may be implemented at the extended state.

Also, since the mobile terminal may naturally be slid without distortion, the mobile terminal may be prevented from being damaged or disordered in the middle of being used.

Also, the rack gear may be prevented from being exposed to the outside in a state that the rack gear is extended, whereby a contaminant may be prevented from entering the mobile terminal and durability may be improved.

Further scope of applicability of the present disclosure will become apparent from the detailed description given hereinafter. However, it should be understood that the detailed description and specific examples, while indicating preferred embodiments of the disclosure, are given by illustration only, since various changes and modifications within the spirit and scope of the disclosure will become apparent to those skilled in the art from this detailed description.

BRIEF DESCRIPTION OF THE DRAWINGS

The present disclosure will become more fully understood from the detailed description given herein below and the accompanying drawings, which are given by illustration only, and thus are not limitative of the present disclosure, and wherein.

DETAILED DESCRIPTION OF THE INVENTION

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be directly connected with the other element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

Figure 1:
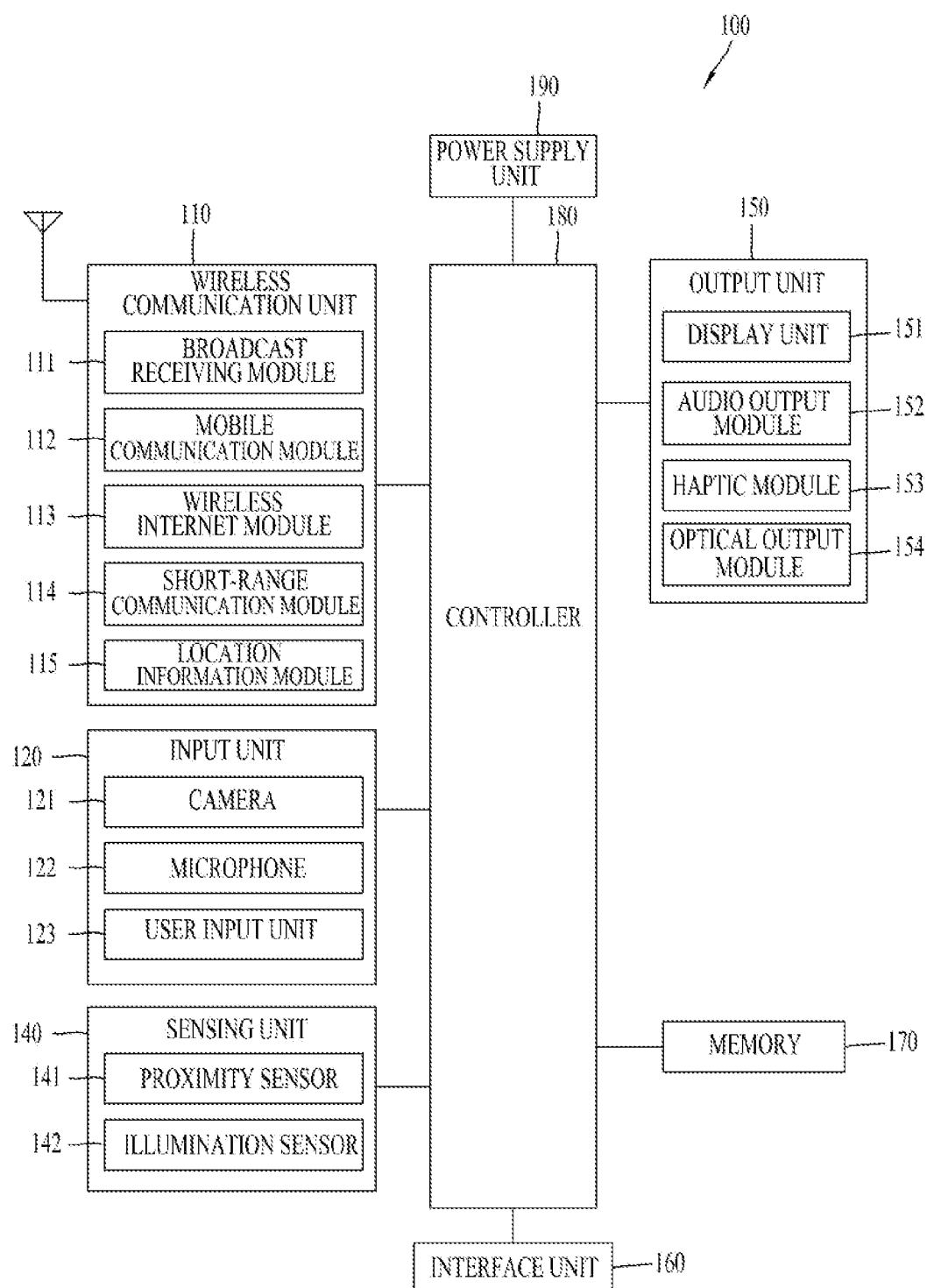
FIG. 1 is a block diagram of a mobile terminal in accordance with the present disclosure.

FIG. 1 is a block diagram of a mobile terminal in accordance with the present disclosure.

The mobile terminal 100 is shown having components such as a wireless communication unit 110, an input unit 120, a sensing unit 140, an output unit 150, an interface unit 160, a memory 170, a controller 180, and a power supply unit 190. Referring now to FIG. 1, the mobile terminal 100 is shown having wireless communication unit 110 configured with several commonly implemented components. It is understood that implementing all of the illustrated components is not a requirement, and that greater or fewer components may alternatively be implemented.

More specifically, the wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks.

To facilitate such communications, the wireless communication unit 110 includes one or more of a broadcast receiving module 111, a mobile communication module 112, a wireless Internet module 113, a short-range communication module 114, and a location information module 115.

Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like).

Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal. As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is typically implemented using one or more sensors configured to sense internal information of the mobile terminal, the surrounding environment of the mobile terminal, user information, and the like. For example, the sensing unit 140 may alternatively or additionally include other types of sensors or devices, such as a proximity sensor 141 and an illumination sensor 142, a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154. The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output, or activating application programs stored in the memory 170.

To drive the application programs stored in the memory 170, the controller 180 may be implemented to control a predetermined number of the components mentioned above in reference with FIG. 1. Moreover, the controller 180 may be implemented to combinedly operate two or more of the components provided in the mobile terminal 100 to drive the application programs.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

Some or more of the components may be operated cooperatively to embody an operation, control or a control method of the mobile terminal in accordance with embodiments of the present disclosure. Also, the operation, control or control method of the mobile terminal may be realized on the mobile terminal by driving of one or more application problems stored in the memory 170.

Figure 2:
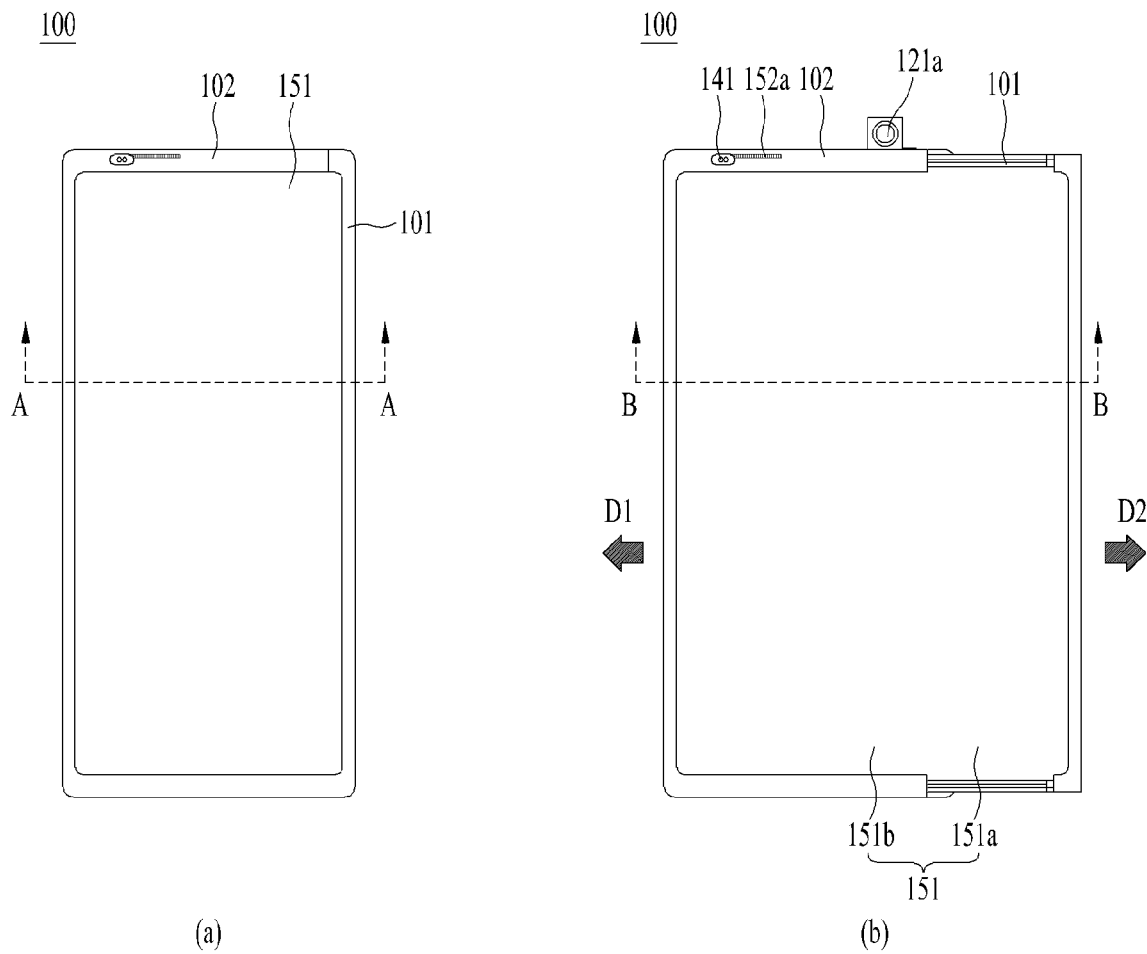
FIG. 2 is a front view of a first state and a second state of the mobile terminal in accordance with an embodiment.
Figure 3:
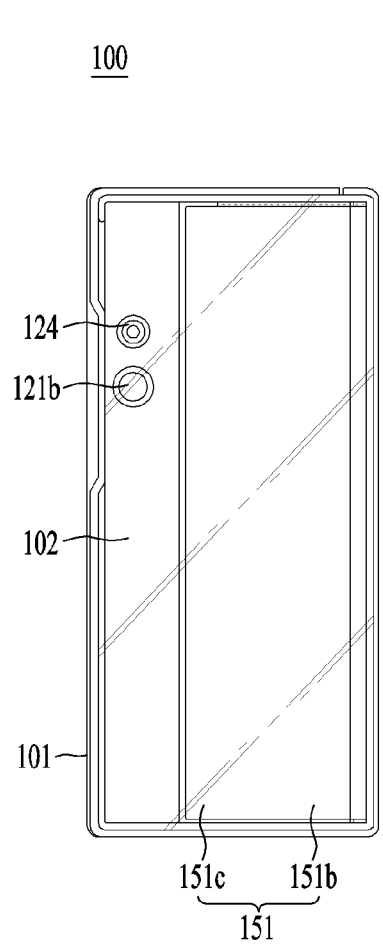
FIG. 3 is a rear view of the first state and the second state of the mobile terminal in accordance with an embodiment.
Figure 3:
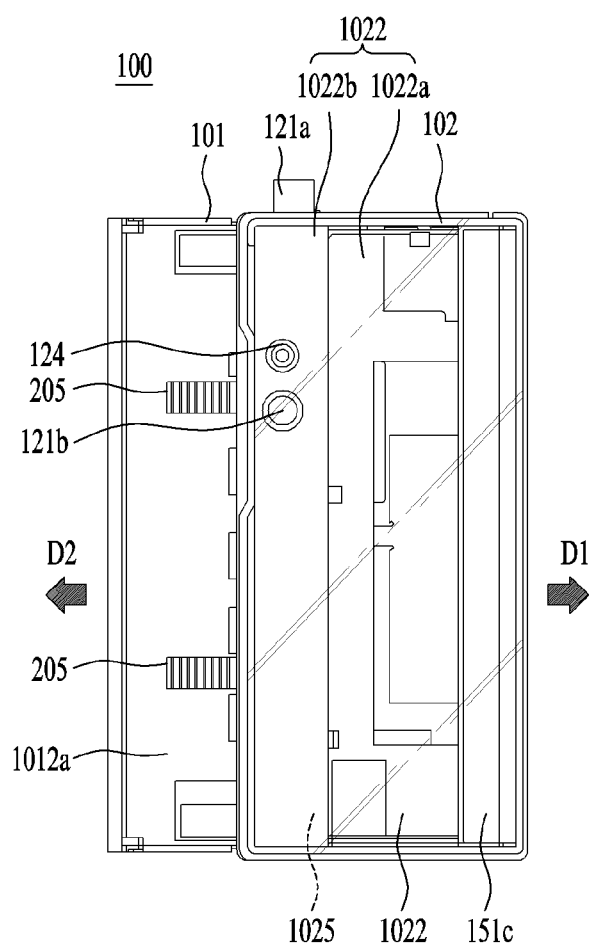

FIG. 2 is a front view of a first state and a second state of the mobile terminal in accordance with an embodiment, and FIG. 3 is a rear view of the first state and the second state of the mobile terminal in accordance with an embodiment. FIGS. 2(a) and 3(a) are views showing the first state in which the mobile terminal is contracted, and FIGS. 2(b) and 3(b) are views showing the second state in which the mobile terminal is extended.

The mobile terminal 100 of the present disclosure includes a body of which size is varied. The body includes a first frame 101 and a second frame 102, and its size may be varied while the second frame 102 is moving in a first direction or second direction of the first frame 101. The first state is the state that the body (mobile terminal) is downsized, and the second state is the state that the body (mobile terminal) is extended.

Movement of the first frame 101 is relative to that of the second frame 102, and the second frame 102 moves in the first direction based on the first frame 101 during switching from the first state to the second state, and the first frame 101 moves in the second direction based on the second frame 102. Therefore, extension in the first direction means extension in a horizontal direction on the drawing.

As shown in the figures, the mobile terminal 100 in the first state is in a contracted position, and has a smaller size than the mobile terminal 100 in the second state. In addition, the size of the display unit 151 positioned on the front of the mobile terminal 100 is also smaller than in the second state. The mobile terminal 100 in the first state may be extended in a first direction D1 to switch to the second state. In the second state, as shown in FIG. 2(*b*), the size of the mobile terminal 100 and the size of the display unit 151 positioned on the front of the mobile terminal 100 are larger than in the first state, while the size of the display unit 151 positioned on the rear of the mobile terminal 100 is reduced as shown in FIG. 3(*b*). That is, a part of the display units 151 positioned on the rear of the mobile terminal 151 in the first state moves to the front of the mobile terminal 100 in the second state.

In the following description, the direction in which the mobile terminal 100 and the display unit 151 thereof are extended or enlarged is defined as a first direction D1, and the direction in which the mobile terminal contracts or retracts or is reduced to switch from the second state to the first state is defined as a second direction D2. A direction perpendicular to the first and second directions D1 and D2 is defined as a third direction. Description will be made on the assumption that the first and second directions are horizontal directions and the third direction is a vertical direction. However, depending on the arrangement of the mobile terminal 100, the first and second directions may be vertical directions and the third direction may be a horizontal direction.

As such, a flexible display unit 151 which is bendable may be used as the display unit such that the position of the display unit may be varied. The flexible display unit 151 may be a display unit capable of maintaining a flat state like a conventional flat panel display and capable of warping, bending, folding, twisting, or rolling like paper. The flexible display unit 151 refers to a display which is manufactured on a thin and flexible substrate and is thus lightweight and robust as not to be easily broken. The flexible display unit according the present disclosure may be bent in a specific direction, and may be arranged such that the curvature thereof may change in the first direction.

In addition, an electronic paper is a display technology to which properties of general ink are applied. The electronic paper may be different from the conventional flat panel display in using reflected light. The electronic paper may change information using a twisted ball or electrophoresis using a capsule.

In a state in which the flexible display unit 151 is not deformed (e.g., a state of having an infinite curvature radius, hereinafter referred to as a basic state), a display area of the flexible display unit 151 becomes flat. In a state in which the flexible display unit 151 is deformed by an external force from the basic state (e.g., a state of having a finite radius of curvature, hereinafter referred to as a deformed state), the display area may become a curved face. As shown, information displayed in the deformation state may be visual information output on the curved face. Such visual information is implemented by independently controlling light emission of sub-pixels arranged in a matrix. The sub-pixel refers to a minimum unit for implementing one color. When external force is applied to the flexible display unit 151, the flexible display unit 151 may be deformed to switch from the default state, which is the flat state, to a bent state, which is not the flat state.

The flexible display unit 151 may be combined with a touch sensor to implement a flexible touch screen. When a touch is made on the flexible touch screen, the controller 180 (see FIG. 1) may perform control corresponding to such touch input. The flexible touch screen may be configured to detect the touch input in the deformed state as well as in the basic state.

The touch sensor detects the touch (or touch input) applied on the touch screen using at least one of various touch schemes such as a resistive film scheme, a capacitance scheme, an infrared scheme, an ultrasonic wave scheme, a magnetic field scheme, and the like.

As an example, the touch sensor may be configured to convert a change in pressure applied on a specific portion of the touch screen, capacitance generated at the specific portion, or the like into an electrical input signal. The touch sensor may be configured such that a touch object applying a touch on the touch screen may detect touched position and area on the touch sensor, a pressure during the touch, a capacitance during the touch, and the like.

Further, the mobile terminal 100 may have a deformation detection means for detecting the deformation of the flexible display unit 151. Such deformation detection means may be included in the sensing unit 140 (see FIG. 1).

The deformation detection means may be disposed in the flexible display unit 151 or a case (first to second frames 101 to 102 to be described later) to detect information related to the deformation of the flexible display unit 151. In this connection, the information related to the deformation may include a direction in which the flexible display unit 151 is deformed, a degree of the deformation, a deformed position, a deformed time, an acceleration at which the deformed flexible display unit 151 is restored, and the like. In addition, the information related to the deformation may include various kinds of information that may be detected due to the bending of the flexible display unit 151.

In addition, the controller 180 may change information displayed on the flexible display unit 151 or generate a control signal for controlling a function of the mobile terminal 100 based on the information related to the deformation of the flexible display unit 151 detected by the deformation detection means.

The deformation of the flexible display unit 151 may vary depending on the positions of the first frame 101 and the second frame 102. As shown in FIG. 2, since the bending position on the flexible display unit 151 is determined according to the positions of the first frame and the second frame, the bending deformation position of the flexible display unit 151 and the area thereof positioned on the front may be calculated based on the positions of the first frame 101 and the first frame 102 in place of the deformation detection means of the flexible display unit 151.

The state conversion (first or second state) of the flexible display unit 151, i.e., the size change at the front and rear faces of the mobile terminal 100 of the display unit 151 based on the size change of the mobile terminal 100 may be performed manually by a force applied by the user, but may be not limited to such manual scheme. For example, when the mobile terminal 100 or the flexible display unit 151 is in the first state, the mobile terminal 100 or the flexible display unit 151 may be converted into the second state by the user or an application command without the external force applied by the user. As such, in order for the flexible display unit 151 to be automatically deformed without the external force, the mobile terminal 100 may include a driving unit 200, which will be described later.

The flexible display unit 151 of the present disclosure is bent 180 degrees by rolling around a side portion of the mobile terminal 100 facing in the first direction. Accordingly, based on the side portion of the mobile terminal 100, a part of the flexible display unit 151 is disposed on the front of the mobile terminal 100, and the other part of the flexible display unit 151 is disposed on the rear of the mobile terminal 100. For simplicity, the part of the flexible display unit 151 positioned on the front is called a front face, and the other part of the flexible display unit 151 positioned on the rear is called a rear face. As illustrated in FIG. 2, the mobile terminal may extend in the first direction or contract in the second direction opposite to the first direction. In this case, the area of the flexible display unit 151 positioned on the front changes. That is, the sizes of the front face and the rear face may be changed according to a change in the state of the mobile terminal.

The part of the flexible display unit 151 positioned on the front of the mobile terminal 100 may be immovably fixed to the front surface of the first frame 101, and the other part thereof positioned on the rear of the mobile terminal 100 may be movably arranged on the rear of the mobile terminal 100.

In addition, the flexible display unit 151 may be rolled on or released at the side portion in the first direction of mobile terminal. Accordingly, the rear face of the display unit 151 moves, so that the size of the front face of the display unit 151 may be adjusted. Since the size of the flexible display unit 151 is determined and the flexible display unit 151 is formed of one continuous body, an area of rear face of the display unit 151 decreases as an area of the front face of the display unit 151 increases. Such a display unit 151 may be rolled in a second frame 102, which is movable relative to a first frame 101 to be described later, more correctly, on one of sides of the second frame 102. The display unit 151 may be withdrawn or pulled out from or inserted or pushed into the second frame 102 while being rolled in the second frame 102 along a moving direction of the second frame 102 to adjust the area of the display unit 151 on the front face of the mobile terminal 100. Such operation will be described in more detail below along with other relevant components of the mobile terminal 100.

Typically, an antenna is disposed in the case or the housing of the mobile terminal 100, but a portion where the antenna is installed in the case or the housing may be limited because of the flexible display unit 151 that covers not only the front face of the mobile terminal 100 but also the rear face thereof. For this reason, the antenna may be implemented on the flexible display unit 151. An antenna on display (AOD) is an antenna in which a transparent film is formed by stacking an electrode layer and a dielectric layer that have patterns engraved thereon, respectively. The antenna on display may be implemented thinner than an antenna implemented using a laser direct structuring (LDS) technology using a conventional copper nickel plating scheme, so that the antenna on display may not be exposed to the outside without affecting a thickness. In addition, the antenna on display may transmit and receive a signal directly to or from the display unit 151. Accordingly, the antenna on display may be used in the mobile terminal 100 in which the display unit 151 is located on the both faces of the mobile terminal 100 as in the present disclosure.

The mobile terminal 100 may include a rear camera 121b located on the rear surface thereof as shown in FIG. 3. A rear portion of the display unit 151 may be located in the first direction at the first state, and components such as the camera 121b, the user input unit 123 and the antenna fingerprint sensor may be packaged in a space of the second direction.

Figure 4:
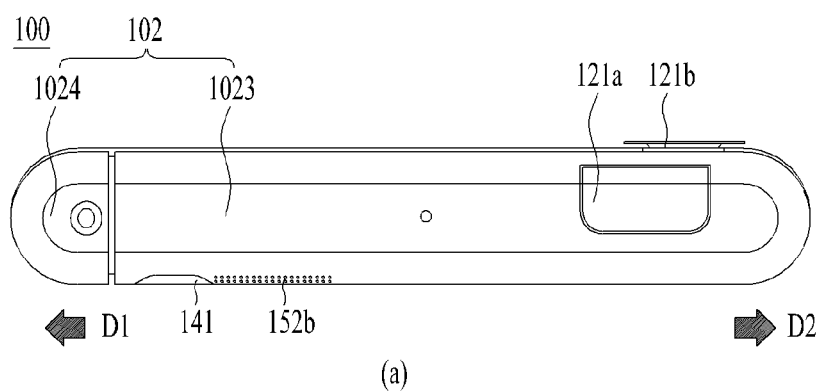
FIG. 4 is a side view of the mobile terminal as viewed from a third direction.
Figure 4:
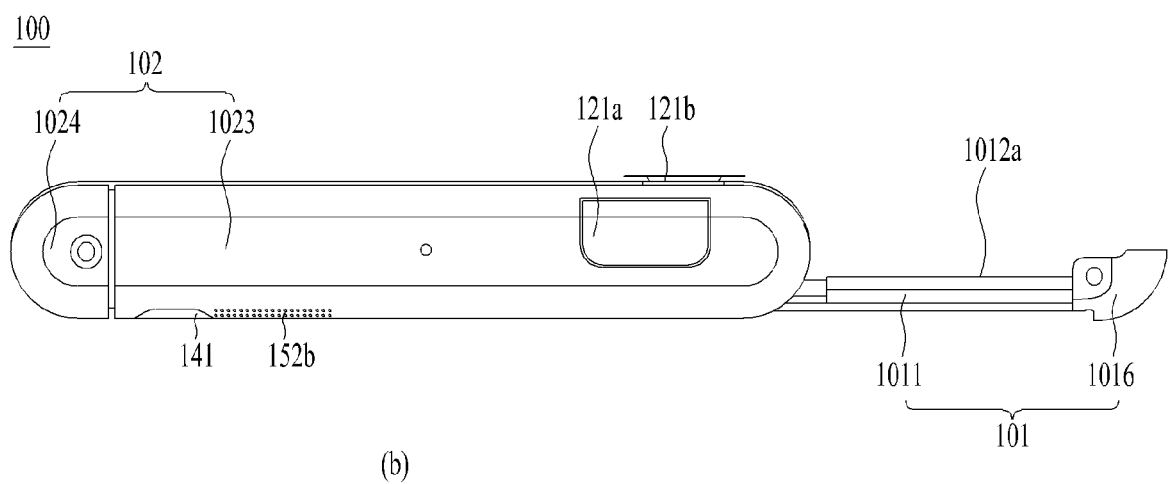

FIG. 4 is a side view of the mobile terminal 100 as viewed from a third direction. The first frame 101 of the present disclosure is a plate shaped member thinner than the second frame 102, supports the rear surface of a first area of the display unit 151 and the first area is slid, whereby an area of a front portion of the flexible display unit 151 is extended. The second frame 102 is thicker than the first frame 101, and includes a front portion and a rear portion 1022, wherein various components may be accommodated between the front portion and the rear portion, and the flexible display unit 151 may be rolled and extended in a rear direction from an end portion in the first direction of the second frame 102. The second frame 102 may further include a side frame 1024 that includes a curved surface at the end portion of the first direction and protects a side portion of the flexible display unit 151, which is bent to surround the second frame 102.

The first frame 101 is thin and its components are substantially packaged in the second frame 102, and the rear surface of the mobile terminal of the first state may be configured by the rear portion 1022 of the second frame 102. The rear portion 1022 of the second frame 102 may include a first rear portion 1022a in which the rear portion of the flexible display unit 151 is located in the first direction, and a second rear portion 1022b always exposed to the rear direction at the first state and the second state.

The rear camera 121b headed for the rear direction of the mobile terminal may be packaged in the second rear portion 1022b, and may include a plurality of cameras having different viewing angles such as wide angle, super-wide angle and telescope. In addition to the rear camera 121b, a proximity sensor 141, an audio output module 152, etc. may be located in the second rear portion 1022b, and an antenna may be provided therein.

In the first state, as shown in FIG. 3(a), the rear camera 121b disposed in parallel with the rear portion of the display unit 151 may enable selfie photographing, and in order to take a target viewed by a user, the user may take the front portion of the display unit 151 even at the second state as well as the first state while viewing the front portion of the display unit 151. In the second state, as shown in FIG. 3(b), the rear camera 121b is disposed at the center portion of the mobile terminal 100 such that the user easily focuses a position of a subject on the center while viewing the display unit during photographing.

The first rear portion 1022a of the second frame is a space to which the rear portion of the display unit 151 moves. The first rear portion 1022a may further include a rear cover 1025 to prevent the first rear portion 1022a of the second frame 102 from being exposed to the outside without disturbing movement of the display unit 151. The display unit 151 and a slide frame 103 may move between the rear cover 1025 and the first rear portion 1022a. The rear cover 1025 may cover the first rear portion 1022a only, or may protect components such as a camera by covering the second rear portion 1022b as well as the first rear portion 1022a.

The rear cover 1025 may be made of an opaque material but if it is made of a light-transmissive material, information may be provided to a user by using the display unit located on the rear surface of the mobile terminal. The rear cover 1025 may be configured such that its inside is seen to the user only if the display unit 151 is activated through mirror-coating but is not seen to the user when the display unit 151 is not activated. Mirror-coating of the rear cover 1025 may be omitted for the portion where the rear camera 121b is located, whereby transparency may be enhanced.

As shown in FIG. 2(b) and FIG. 3(b), the mobile terminal 100 may further include a pop-up camera 121a protruded from the end of the third direction. Since a camera needs a lens of a predetermined size or more to make sure of quality such as resolution, if the camera is located in an upper bezel of the display unit 151, it is difficult to reduce a size of the upper bezel of the mobile terminal. In order to minimize the size of the upper bezel on the front surface of the mobile terminal, the camera may be implemented in the form of pop-up for selectively accommodating or drawing out the camera.

If the pop-up camera 121a is not used, the pop-up camera 121a may be protruded upwardly when the user activates a camera function in a state that it is located inside the second frame 102. Although the pop-up camera 121a is protruded at the second state as shown, it may be drawn out from the second frame 102 even at the second state when the camera function is activated.

The pop-up camera 121a may be drawn out from the second frame 102 by an elastic member, or may be drawn out using a separate motor. If the motor 201 is used, the pop-up camera 121a may automatically be drawn out or accommodated in the frame depending on whether the camera function is activated. The pop-up camera 121a may be disposed toward the front of the mobile terminal but may be rotated to be disposed toward the rear.

Alternatively, if the pop-up camera 121a is accommodated in the second frame 102, an image may be taken through a lens hole formed in the second rear portion toward the rear direction, and if the pop-up camera 121a is drawn out from the second frame 102, it may include a rotational camera that enables selfie photographing toward a front direction.

As another embodiment, the pop-up camera 121a may take the front of the mobile terminal as the rear camera 121b located in the rear direction is rotated as much as 180° through hinge movement and changes a direction to the front.

When the pop-up camera 121a is accommodated in the frame, it may be rotated toward the rear and may serve as the rear camera 121b. The pop-up camera 121a and the rear camera 121b of the mobile terminal may be implemented as camera modules.

Figure 5:
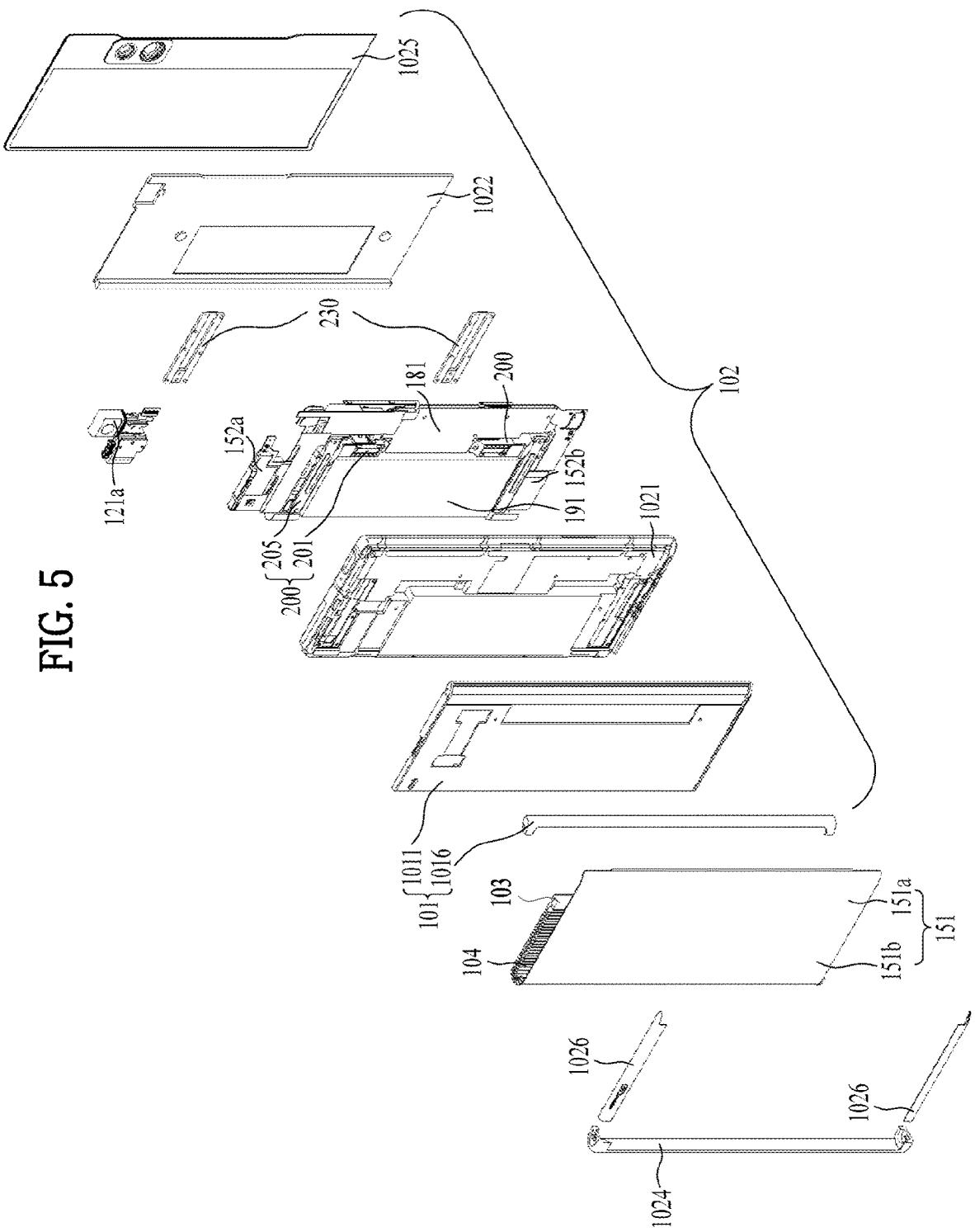
FIGS. 5 and 6 are exploded perspective views of the mobile terminal in accordance with an embodiment.
Figure 6:
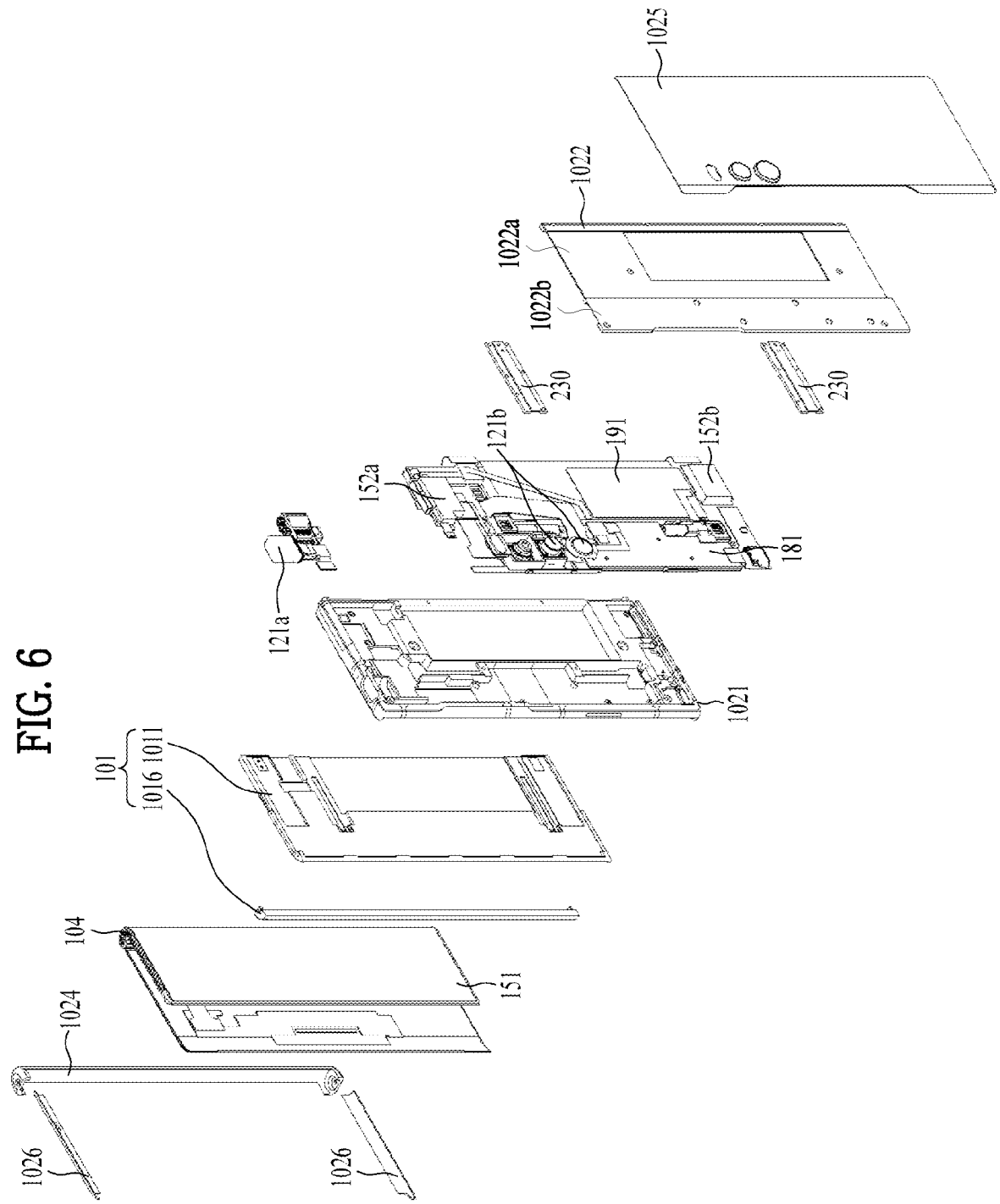

FIGS. 5 and 6 are exploded perspective views of the mobile terminal in accordance with an embodiment. FIG. 5 is an exploded perspective view of the mobile terminal as viewed from the front side, and FIG. 6 is an exploded perspective view of the mobile terminal as viewed from the rear side.

The mobile terminal 100 of the present disclosure includes frames 101 and 102 in which components are mounted, and the frames 101 and 102 of the present disclosure may vary in size in the first direction as shown in FIG. 2. One or more frames 101 and 102 move relative to each other, and sizes thereof may vary in the first direction. Electronic components are mounted in the frames 101 and 102, and the flexible display unit 151 is located out of the frames 101 and 102.

Since the mobile terminal 100 of the present disclosure includes the flexible display unit 151, the flexible display unit 151 may be combined in a form surrounding front faces and rear faces of the frames 101 and 102. The frame may include the first frame 101 and the second frame 102 moving in the first direction with respect to the first frame 101. The first frame 101 and the second frame 102 include front portions, a rear portions, and side portions, respectively, and are coupled to each other.

The first frame 101 constitutes the front surface of the mobile terminal, and is coupled to the second frame 102 on the rear surface of the first frame 101. The second frame 102 may include a front portion 1021, a rear portion 1022, and a main body including a space in which various components are accommodated between side portions forming lateral appearance of the mobile terminal 100. The camera 121, the audio output module 152, the input and output terminals, the controller 180 and the power supply unit 190 may be accommodated in the space of the second frame 101 as the components of the mobile terminal 100. For example, the controller 180 may be a processor for controlling the operation of the mobile terminal 100 and a circuit board 181 including an electronic circuit, and the power supply unit 190 may be the battery 191 and related components. The driving unit 200 for controlling slide movement of the first frame 101 may be accommodated in the second frame 102. An audio hole of an audio output unit 152a packaged in the second frame 102 may be formed at the end in the third direction of the second frame 102, that is, a position which is not overlapped with the first frame 101, as shown in FIG. 2.

The first frame 101 may slidably be coupled to the front of the second frame in the second direction, and the first area of the display unit 151 is only coupled to the first frame 101 and the other electronic components may all be located in the second frame 102. As described above, a front deco 1026 in the third direction and a fourth direction opposite to the third direction may be configured to be coupled to the second frame 102 to from the audio hole of the audio output unit 152a in the second frame 102. An edge deco 1016 serves to fix an end portion of a first area 151a to the first frame 101. When the mobile terminal 100 is extended at the second state, since the end portion in the second direction is vulnerable, a metal material may be used to reinforce rigidity.

Also, the front end portion of the flexible display unit 151 may be coupled to the first frame 101 while constituting a curved surface such that it may be configured symmetrically with a side portion rolled in the second direction, and may include a curved surface corresponding to that of the flexible display unit 151.

As described above, the display unit 151 has the continuous body, and thus, may be disposed on both the front face and the rear face of the mobile terminal 100 while being rolled in the mobile terminal 100. The display unit 151 may include the front face positioned at the front face of the mobile terminal 100, the rear face positioned at the rear face of the mobile terminal 100, and the side face positioned between the front face and the rear face thereof and surrounding the side face of the mobile terminal. The front face and the rear face of the display unit 151 are flat, and the side face of the display unit 151 may form a curved face. The flexible display unit 151 may be damaged when being bent at an angle. Thus, the flexible display unit 151 may be formed to be bent with a predetermined curvature at the side face.

The display unit 151 may be divided into a fixed portion 151a and a variable portion 151b. The fixed portion 151a means a portion fixed to the frame. Since the fixed portion is fixed to the frame, it is maintained at a certain shape without change in its bending level. On the other hand, the variable portion 151b means a portion where an angle of a bent portion is varied or a position of the bent portion is varied. The variable portion 151b in which the bent position or angle is varied needs a structure for supporting a rear surface of the variable portion 151b to correspond to the above change.

The fixed portion 151a is coupled to the first frame 101 of the display unit and always located on the front surface to constitute a portion of the front portion. The variable portion 151b includes a side portion located in a side direction of the mobile terminal, and a position of the side portion is varied depending on the position of the second frame 102. Based on the side portion, an area located on the front surface and an area of the rear surface are varied. That is, the variable portion 151b may partially be the front portion or the rear portion depending on the first state and the second state. Based on the mobile terminal, the variable portion 151b is located in the first direction with respect to the fixed portion 151a, and an end portion of the variable portion 151b is bent in a rear direction of the mobile terminal 100 and slidably moves from the rear surface of the second frame 102.

The end portion of the variable portion 151b of the display unit is coupled to the slide frame 103 that guides the variable portion 151b to slidably move on the rear surface of the second frame, and the slide frame 103 moves on the second frame 102 in the first direction when the second frame 102 moves in the first direction. As a result, the slide frame 103 moves with respect to the first frame at a distance corresponding to twice of the second frame 102. In another aspect, as well shown in FIG. 3, the rear portion 1022 of the mobile terminal 100 may include an exposed rear portion 1015 exposed to the outside without being covered by the display unit 151 even at the first state. Also, the display unit 151 may be rolled in the second frame 102 and bent at 180° to be disposed on both the front surface and the rear surface of the mobile terminal 100. For this arrangement of the display unit 151, the second frame 102 may include a roller rotatably disposed therein.

However, the display unit 151 should be spread to be flat on the front surface and the rear surface of the mobile terminal 100 to provide a user with a screen of good quality. To this end, proper tension should be provided to the display unit 151. To provide proper tension, the roller may be disposed at the end portion in the first direction of the second frame 102. The roller may rotatably be coupled to the second frame 102. A plurality of the rollers 10 may be distributed and disposed in the third direction in consideration of arrangement of components packaged in the second frame 102.

The display unit 151 may gently be bent with a predetermined curvature and rolled in the roller. The flexible display unit 151 may include a first surface outputting an image, exposed to the outside, and an inner surface headed for the frame at an opposite side of the first surface. The roller may be provided to be freely rotated in the second frame 102 while being in contact with the inner surface of the display unit 151.

Also, the roller may be disposed to adjoin the end portion in the first direction of the second frame 102, and a side frame 1024 may be disposed at the end portion in the first direction of the second frame 102 to prevent the display unit 151 rolled in the roller, that is, the curved portion, from being damaged.

The side frame 1024 may longitudinally be extended in a length direction (third direction) of the second frame 102 and may cover the side portion in the first direction, whereby the display unit 151 rolled in the end portion of the first direction of the second frame 102 may be protected. The inner side of the side frame 1024 may include a curved surface corresponding to a curvature of the side portion.

The side frame 1024 may substantially form external appearance of the mobile terminal 100 together with the side portion 1023 of the first frame 101. Also, the second frame 102 may be omitted at the side portion in the second direction to minimize interference with the components within the first frame 101 during movement.

Also, the body may extend or downsize the size of the mobile terminal 100, particularly the front surface of the mobile terminal 100 by extension and contraction to the first and second directions D1 and D2, and the display unit 151 should move as much as the extended or downsized front surface to obtain the first and second states which are intended. However, if the display unit 151 is fixed to the second frame 102, the display unit 151 cannot actively move to correspond to the extended or downsized front surface of the mobile terminal 100. For this reason, the display unit 151 may movably be coupled to the second frame 102.

In more detail, the display unit 151 may include a first area 151a disposed on the front surface of the mobile terminal 100 and a second area 151b extended from the first area 151a in the first direction and bent to surround the second frame 102. The second area 151b may move to the front surface or the rear surface in accordance with a state change of the mobile terminal 100 and switch the front portion to the rear portion or vice versa.

The slide frame 103 may be comprised of a plate shaped member longitudinally extended in the length direction (third direction) of the mobile terminal 100, and may movably be coupled to the second rear portion 1022 in the first and second directions D1 and D2. The end portion of the second area 151b may be coupled to the rear surface of the slide frame 103, whereby slide movement of the slide frame 103 may interact with slide movement of the first frame 101 and the movement of the display unit 151.

The respective areas 151a and 151b of the display unit 151 may be connected with each other, and may form a continuous body of the display unit 151. Also, as described above, for movement of the second area 151b to the front surface or the rear surface of the mobile terminal 100 based on the moving direction of the second frame 102, the first area 151 is fixed to the front surface of the mobile terminal 100 without movement, and may be movably provided on the rear surface of the mobile terminal 100. This configuration of the display unit 151 will be described in more detail.

The first area 151a may be disposed on the front surface of the mobile terminal 100, more specifically the front surface of the first frame 101. The first area 151a may be exposed to the front surface of the mobile terminal 100.

The second area 151b is a portion extended to adjoin the first area 151a in the first direction, and surrounds the end portion in the first direction of the second frame 102 and is partially disposed on the rear surface of the mobile terminal 100 to configure the rear portion.

The rear portion of the second area 151b may be disposed on the rear surface of the mobile terminal 100, more specifically the rear surface of the rear portion 1022 of the second frame 102. The second area 151b may be coupled to the slide frame 103 without being directly coupled to the second frame 102, and may slide on the rear surface of the second frame 102.

The first area 151a is disposed on the front surface of the mobile terminal 100 and always exposed to the front surface regardless of movement of the second frame 102. The second area 151b has an area on the front surface and the rear surface, which is varied depending on the moving directions D1 and D2 of the second frame 102.

A specific location of the foldable mobile terminal in a form of being spread like a book is easily damaged because only the specific location is folded repeatedly. On the other hand, a position of the side portion of the flexible display unit 151 may vary based on the first and second states of the mobile terminal 100, that is, the movement of the second frame 102. Accordingly, the mobile terminal 100 of the present disclosure may significantly reduce deformation and fatigue repeatedly applied to a specific portion of the display unit 151, thereby preventing damage to the display unit 151.

Based on the above-described configuration, overall operations of the mobile terminal 100 will be described as follows. As an example, the state conversion may be performed manually by the user, and an operation of the mobile terminal 100 during such manual state conversion will be described. However, operations of the first to third frames 101 to 103 and the display unit 151, which will be described below, may be performed in the same manner when a power source other than a user's force is used, for example, when the driving unit 200 to be described below is applied.

Figure 7:
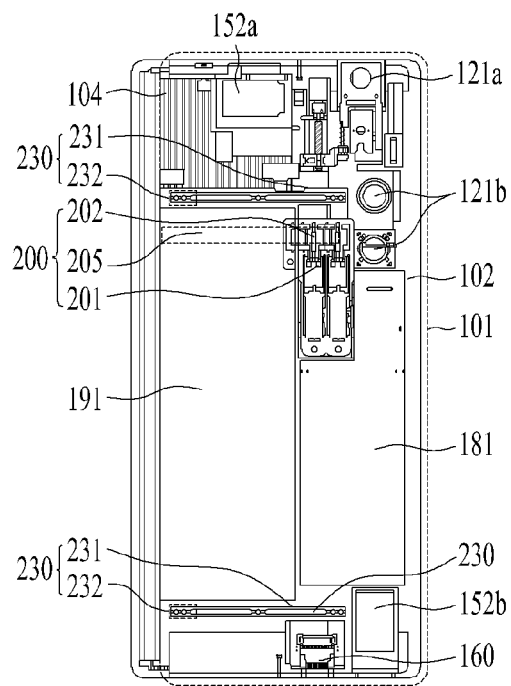
FIG. 7 is a view showing the inside of the mobile terminal according to an embodiment.
Figure 7:
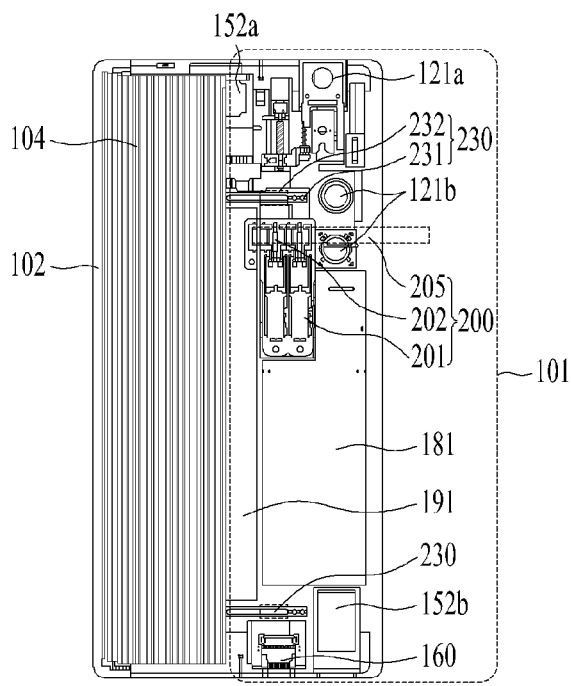

FIG. 7 is a view showing the inside of the mobile terminal 100 according to an embodiment, wherein (a) shows a first state and (b) shows a second state. The mobile terminal 100 of the present disclosure may be switched between the states in such a manner that a user manually pushes or pulls the first frame 101 with respect to the second frame 102 in the first direction D1 or the second direction D2. However, according to the manual switching, if a force is forcibly applied to a main body of the mobile terminal 100, since the mobile terminal 100 may be damaged, the mobile terminal 100 may further include a driving unit 200 that uses a motor 201 to stably move the second frame 102 without distortion.

A motor for providing a rotational force as shown in FIG. 7 may be used as the motor 201, or a linear motor 201 configured to make linear motion may be used. The motor 201 for providing the rotational force should have a large diameter to provide large force. Two motors 201 may be used as shown in FIG. 7 to provide a driving force of a predetermined size or more in the limited space of the mobile terminal 100 without increasing the thickness.

Since the second frame 102 linearly moves with respect to the first frame 101 in the first direction or the second direction, a rack pinion gear 202 configured to convert the rotational force of the motor 201 into linear motion may be used. The pinion gear 202 configured to receive the rotational force of the motor 201 may be arranged to be engaged with a rack gear 205 composed of teeth continuously arranged in the first direction. The pinion gear 202 may be fixed to the first frame 101 together with the motor 201 and the rack gear 205 may be positioned on the second frame 102. On the contrary, the rack gear 205 may be positioned on the first frame 101, and the motor 201 and the pinion gear 202 may be arranged on the second frame 102. Since the motor 201 holds the pinion gear 202 such that the pinion gear 202 does not rotate, the second frame 102 may maintain the first state and the second state. However, when a large external force is applied, the second frame 102 may be dislocated as the pinion gear 202 rotates.

A stopper (not shown) configured to fix the positions of the second frame 102 or between the rack gear 205 and the first frame 101 may be further provided to fix the mobile terminal 100 at the first state or the second state. When electric current flows through the motor 201 to drive the motor 201, the stopper may be released to allow the movement of the second frame 102. When a power source is not applied to the motor 201 and thus the motor 201 does not rotate, the stopper may be fastened to fix the positions of the first frame 101 and the second frame 102.

In order to arrange a battery or the like in consideration of the limited packaging space of the mobile terminal 100, the driving unit 200 may be disposed to be biased to one side as shown in FIG. 7(a).

According to such asymmetric arrangement of the driving unit 200, the second frame 102 may be distorted during movement due to a difference in moving speed between an upper end portion and a lower end portion. To address this issue, a linear guide 230 may be further provided. The linear guide 230 may be disposed to be spaced in the third direction of the mobile terminal 100 to supplement the function of one driving unit 200 biased to one side in the third direction. The linear guide 230 may include a guide rail 231 extended in the first direction and a guide block 232 configured to move along the guide rail 231. The guide rail 231 may be disposed on the first frame 101 and the guide block 232 may be disposed on the second frame 102, or vice versa as shown in FIG. 7.

After the guide block 232 is coupled to the first frame 101 and the guide rail 231 is coupled to the second frame 102, the guide block 232 and the guide rail 231 may be slidably fastened to each other. However, for convenience of the fastening, the guide block 232 and the guide rail 231 fastened to each other. Then, the guide block 232 may be first fixed to the first frame 101, and then the second frame 102 may be coupled to the guide rail 231.

The guide block 232 may be provided with a guide groove into which the guide rail 231 is inserted. Alternatively, the guide rail 231 may be provided with a rail groove into which a portion of the guide block 232 is inserted. The fastening portions of the guide rail 231 and the guide block 232 may be formed to be bumpy. Accordingly, movement in the first direction or the second direction may be made without displacement in the thickness direction of the mobile terminal 100. In order to reduce friction between the guide block 232 and the guide rail 231, a self-lubricating member having high wear resistance and low friction resistance, such as a bearing or polyoxymethylene (POM), may be added to the inside of the guide groove.

Figure 8:
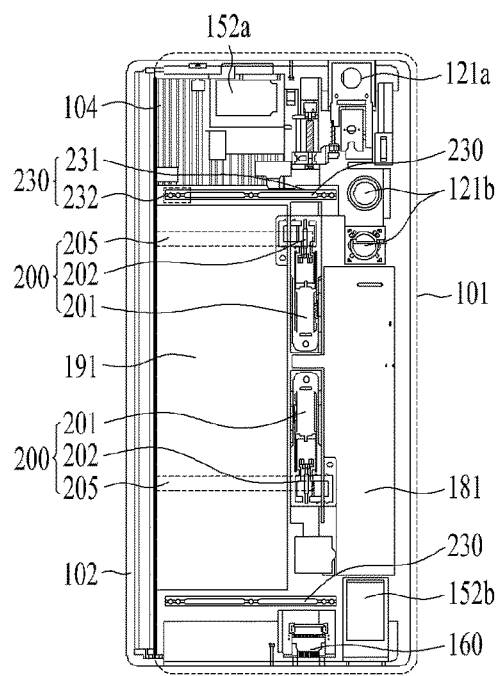
FIG. 8 is a view showing the inside of the mobile terminal according to another embodiment.
Figure 8:
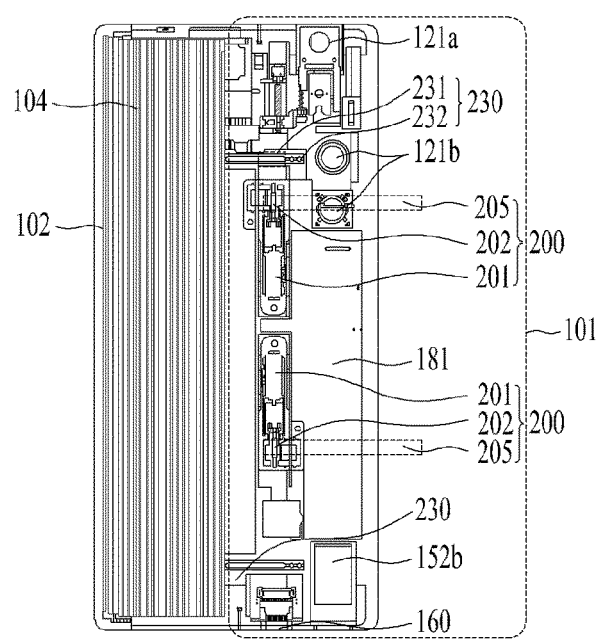

FIG. 8 is a view showing the inside of the mobile terminal 100 according to another embodiment. Unlike the aforementioned embodiment, a pair of motors 201 are disposed to be spaced apart from each other in an up and down direction.

As described above, the biased arrangement of the motor 201 has a problem that the first frame 101 is biased to one side during movement. If upper and lower sides of the mobile terminal 100 do not move at the same speed, an error operation of the motor 201 may occur, and a tensile force occurs in one side of the flexible display unit 151 and contraction occurs in the other side of the flexible display unit, whereby the flexible display unit 151 may be damaged.

If the pair of motors 201 are disposed to be spaced apart from each other in an up and down direction, a sufficient driving force may be provided thereto and distortion in the up and down direction may be avoided. Also, since the driving units 200 disposed in the up and down direction keep balance in the up and down direction, a separate linear guide 230 may be omitted.

Figure 9:
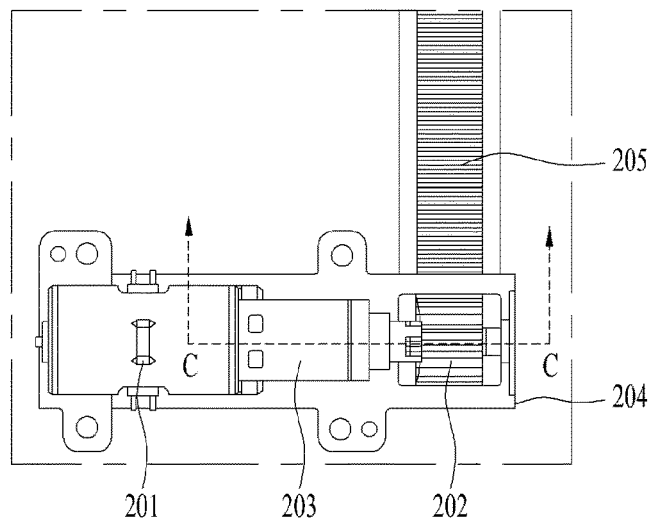
FIG. 9 is a view showing a driving unit of the mobile terminal in accordance with an embodiment.
Figure 9:
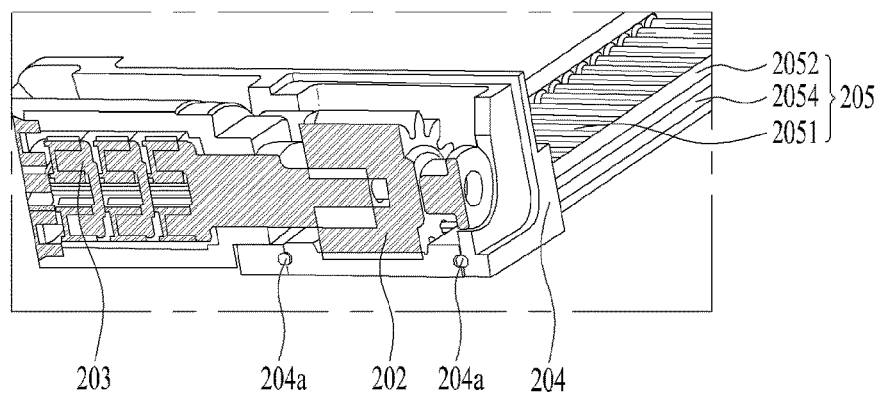
Figure 9:
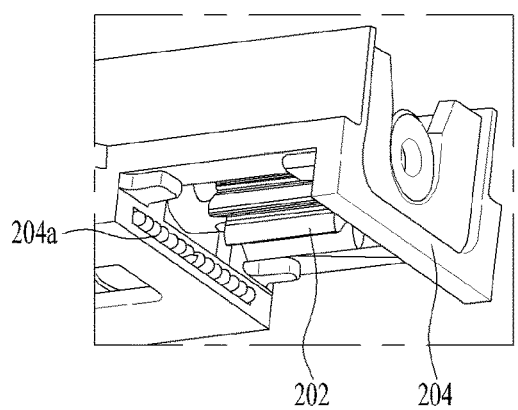

FIG. 9 is a view showing the driving unit 200 of the mobile terminal in accordance with an embodiment. The driving unit 200 includes a motor 201, a planet gear and a pinion gear 202 for adjusting RPM of the motor 201, a rack gear 205 engaged with the pinion gear 202, making linear movement by a rotational force of the pinion gear 202, and a motor housing 204 in which the motor 201, the planet gear and the pinion gear 202 are accommodated. FIG. 9(a) is a plane view of the driving unit, FIG. 9(b) is a cross-sectional view taken along line C-C of FIG. 9(a), and FIG. 9(c) is a perspective view showing a portion corresponding to the motor housing 204 and the pinion gear 202 in a state that the rack gear 205 is removed.

The rack gear 205 has teeth formed on a surface headed for the pinion gear 202 and thus engaged with the pinion gear 202, wherein the teeth may be continuously formed in the first direction. An edge portion 2052 which is not provided with teeth may be further provided at both portions of the portion where the teeth are formed.

The motor housing 204 may expose the pinion gear 202 to allow the rack gear 205 and the pinion gear 202 may move while adjoining each other, and may further include a rack gear guide located in the third direction of the rack gear 205 such that the rack gear 205 is not vibrated in the third direction. The rack gear guide guides a slide moving direction of the rack gear 205 in contact with the edge portion 2052 of the rack gear 205. However, if the rack gear guide is in contact with the rack gear 205, problems occur in that friction occurs during slide movement and the driving force of the driving unit 200 is deteriorated.

Rail bearings 204a and 2054 may be provided as shown in FIGS. 9(b) and ((c) to reduce friction between the rack gear guide and the rack gear 205. The rail bearings 204a and 2054 include a plurality of bearing balls 204a that reduce friction while rotating when the rack gear 205 slidably moves between the rack gear guide and the edge portion 2052 of the rack gear 205. The ball rail 2054 including a curved surface corresponding to that of the bearing ball 204a may be formed at the side of the rack gear 205 and the gear guide to allow the bearing ball 204a not to be detached therefrom.

Although the driving unit 200 having one motor 201 is shown, two motors 201 may be provided as shown in FIG. 7, and if the rail bearings 204a and 2054 are applied to the gear guide, the linear guide 230 may be replaced with the gear guide.

Figure 10:
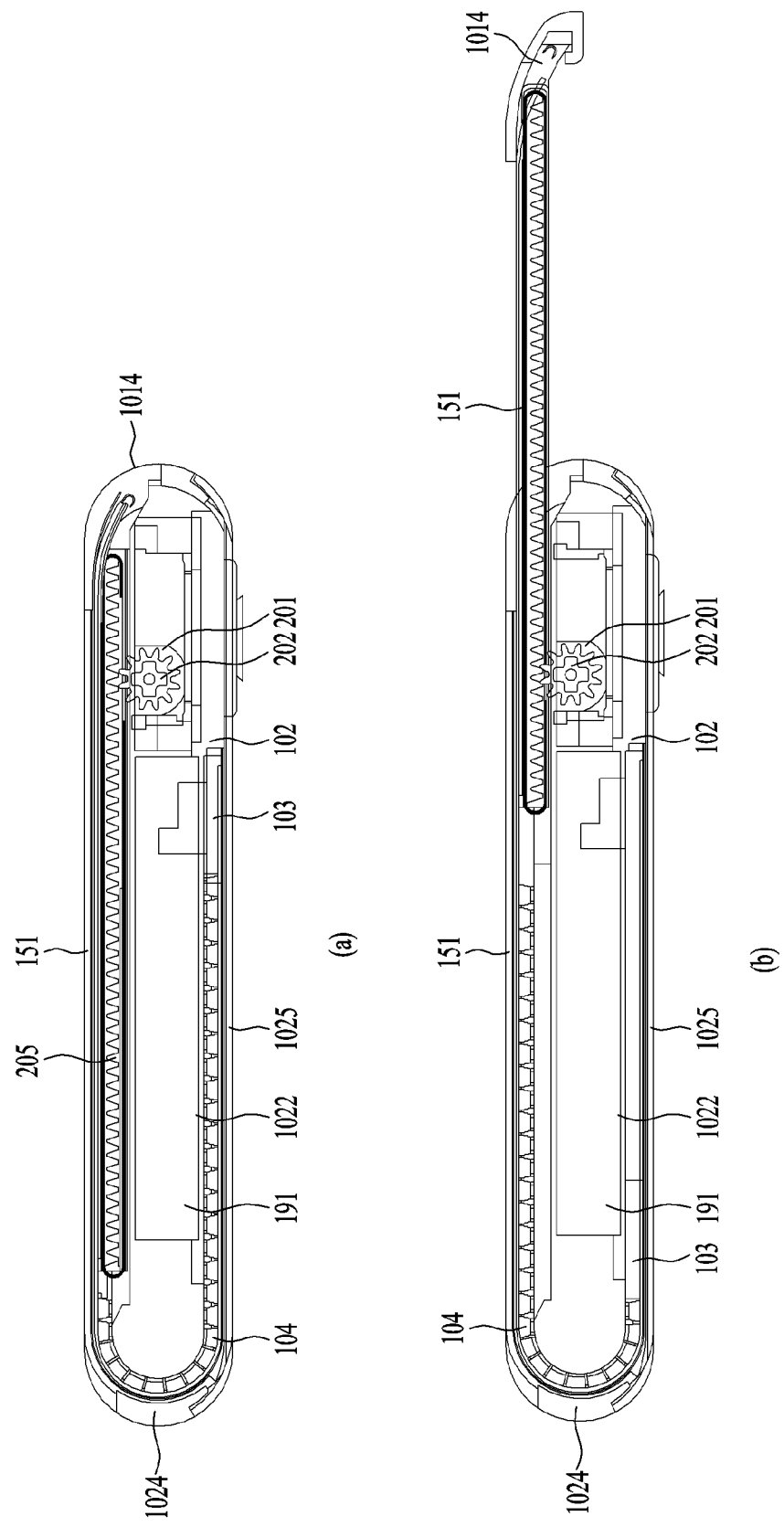
FIG. 10 is a cross-sectional view taken along lines A-A and B-B in FIG. 2.

FIG. 10 is a cross-sectional view taken along lines A-A and B-B in FIG. 2. As shown in FIG. 2, if the second frame 102 moves in the first direction and then is switched to the second state, a structure for moving the second area 151b, which is located in the rear direction, in a front direction and supporting the rear surface of the moved second area 151b is required. Although the front portion 1021 located on the front surface of the second frame 102 may be located on the rear surface of the second area 151b at the second state, since the front portion 1021 is disposed on the rear surface of the first frame 101 at the first state, a step difference occurs between the front surface of the first frame 101 and the front surface of the second frame 102 at the second state.

A boundary may occur in the first area 151a and the second area 151b of the flexible display unit 151 by the step difference between the front surface of the first frame 101 and the front surface of the second frame 102. A rolling hinge 104 located on the rear surface of the second area 151b may be provided to fill a gap space between the front portion 1021 of the second frame and the second area 151b of the flexible display unit 151 and maintain a flat surface of the second area 151b without sagging down.

The rolling hinge 104 may be located on the rear surface of the second area 151b, and may have a thickness corresponding to the gap space between the front portion 1021 of the second frame 102 and the second area 151b of the flexible display unit 151, at the second state. As shown in FIG. 10(a), the rolling hinge 104 may be rolled in the roller 210 at the first state and located on the front surface, the side and the rear surface of the mobile terminal 100.

As shown in FIG. 10(a), at the first state, the slide frame 103, the flexible display unit 151 and the rolling hinge 104 may be located between the rear portion 1022 of the second frame 102 and the rear cover 1025 covering the rear portion of the display unit 151.

As shown in FIG. 10(b), the rolling hinge 104 moves to the front surface together with the second area 151b during switching to the second state, and may be located at the front of the second frame 102. The slide frame 103 may move between the rear portion 1022 of the second frame and the rear cover 1025.

Since the second area 151b of the display unit 151, in which the rolling hinge 104 is located, is the portion where bending deformation occurs during switching from the first state to the second state, the rolling hinge 104 may be deformed to correspond to deformation of the second area 151b. At the same time, the rolling hinge 104 should have predetermined rigidity to maintain a flat state if the flexible display unit 151 is located on the front surface or the rear surface. That is, the rolling hinge 104 needs a structure for maintaining the flat state in the third direction and enabling bending deformation in the first direction.

Figure 11:
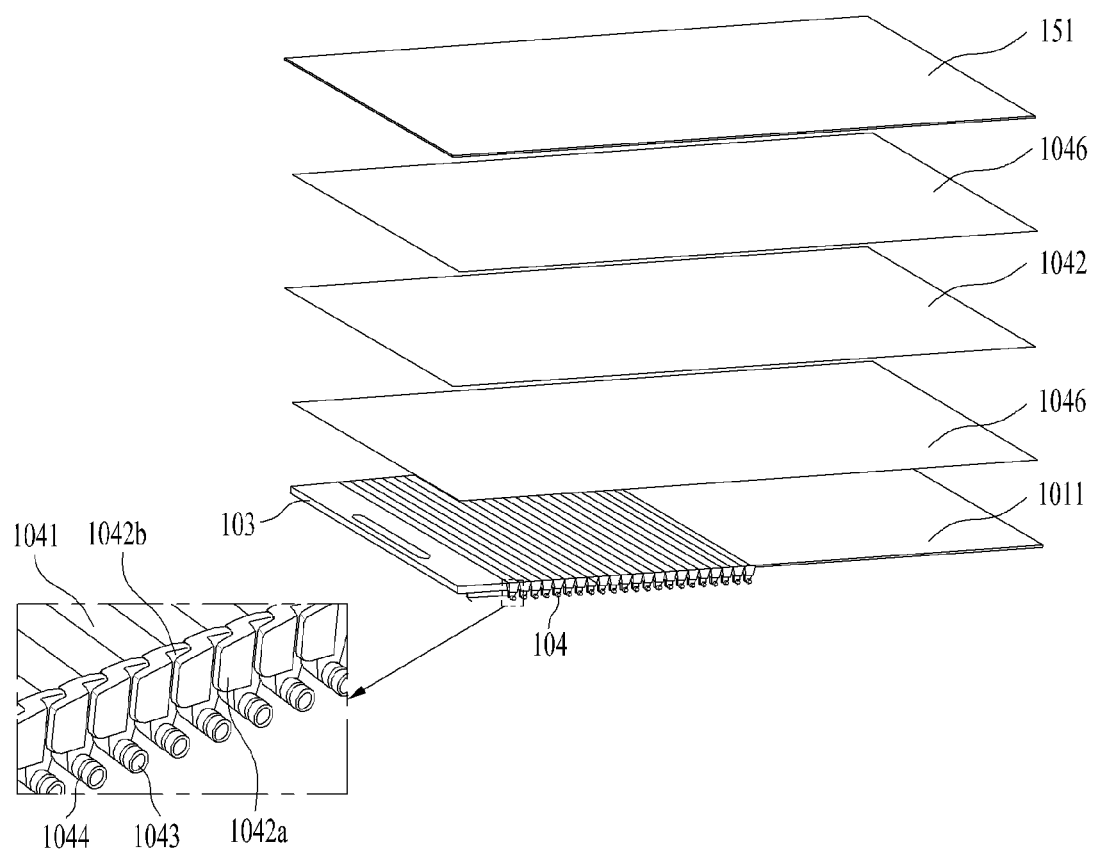
FIG. 11 is a view showing a display unit and a rolling hinge of the mobile terminal in accordance with an embodiment.

FIG. 11 is a view showing a display unit 151 and a rolling hinge 104 of the mobile terminal 100 in accordance with an embodiment. The rolling hinge 104 may include multiple support bars 1041 extending in the third direction. The multiple support bars 1041 may be arranged side by side in the first direction and spaced apart from each other by a predetermined distance. Accordingly, even when the flexible display unit 151 is rolled around the roller 210 and is thus bent, interference between the support bars 1041 may be avoided. The support bars 1041 may be implemented with an injection molding material having a predetermined thickness for stiffness, and may include materials such as SUS or ferrosilicon (FeSi).

The multiple support bars 1041 may be directly attached to the rear surface of the display unit 151. However, this operation may take a long time and produce a lot of defects, resulting in poor productivity. In addition, directly processing the display unit 151 is highly likely to damage the display unit 151. Therefore, a rolling sheet 1045 to fix the multiple support bars 1041 may be further provided. The rolling sheet 1045 may include a metal material, and may employ a superelastic material that is bending-deformable and capable of recovering the flat state after the bending deformation. For example, a superelastic metal sheet such as a thin STS sheet of 0.05 mm or less may be used. An adhesive tape may be attached to both surfaces of the rolling sheet 1045 to bond the rolling sheet 1045 to the support bars 1041 and bond the rear surface of the display unit 151 to the rolling sheet 1045.

The rolling sheet 1045 may be provided with a kerf pattern in which multiple grooves extending in the third direction are formed in the first direction. The grooves in the kerf pattern may be formed between the multiple support bars 1041. The grooves may be formed on a surface of the rolling sheet 1045 to which the support bars 1041 are bonded. The kerf pattern may be formed in a wedge shape that is formed by being gradually narrowed from the surface portion of the rolling sheet 1045.

Instead of the rolling sheet 1045, an elastic material such as silicone may be disposed between the support bars 1041 to join neighboring support bars 1041. In this case, the angle between the support bars 1041 may be varied. The elastic connector may be bent at a position corresponding to the roller 210. When positioned on the front or rear of the mobile terminal, the elastic connector may be unfolded such that the support bars 1041 are disposed forming a flat surface.

The support bars 1041 may form a flat surface corresponding to the rear surface of the display unit 151. Alternatively, as shown in FIG. 8(*b*), the support bars 1041 may be formed in a shape having a predetermined curvature. The curved support bars 1041 may closely contact the curved surface of the roller 210 when the rolling hinge 104 is rolled around the roller 210. Alternatively, one surface of the support bars 1041 in contact with the display unit 151 maintains a flat state, and the other surface thereof on the opposite side may include a curved surface corresponding to the curvature of the roller 210. In this case, the support bars 1041 may be thick at the ends thereof facing in the first and second directions and have the thinnest portion in the middle thereof.

The rolling hinge 104 is disposed at the position corresponding to the second area 151*b*, bent by being rolled in the roller 210 and extends the front surface and the rear surface. The rolling hinge 104 is connected with the first frame 101 in a front direction and connected with the slide frame 103 in the rear direction. In order that the flexible display unit 151 forms a continuous surface without step difference, the first frame 101 located on the rear surface of the first area 151*a* and a surface adjoining the display unit 151 of the rolling hinge 104 located on the rear surface of the second area 151*b* may have the same height. Particularly, since the slide frame 103 moves on the rear surface of the mobile terminal 100 and moves in the same space as the rolling hinge 104, the rolling hinge 104 may have a thickness corresponding to that of the slide frame 103.

Figure 12:
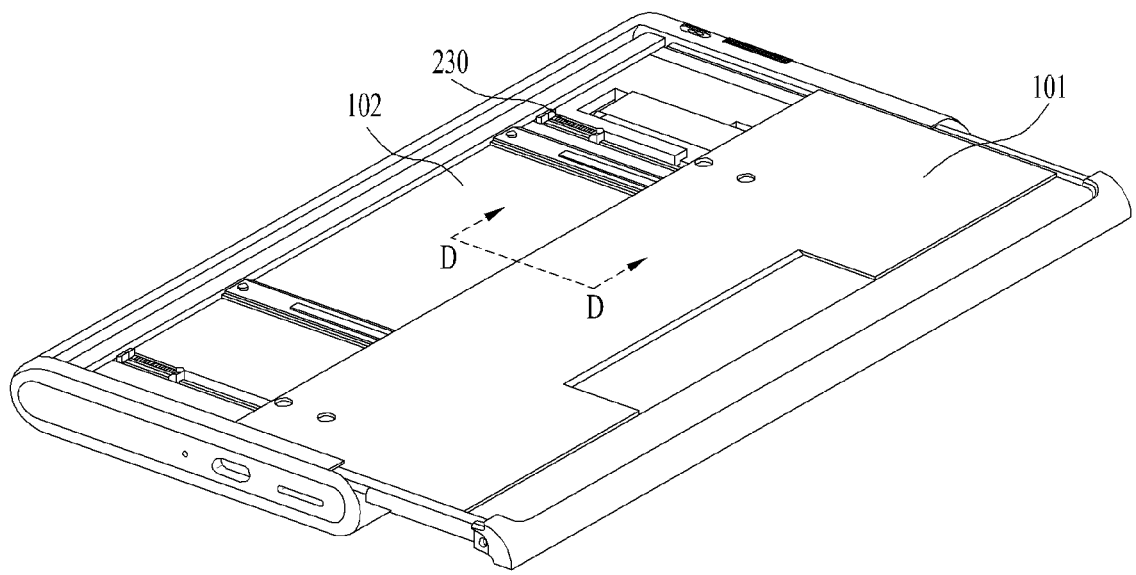
FIGS. 12 and 13 are views showing a first frame and a second frame at a second state of the mobile terminal.
Figure 12:
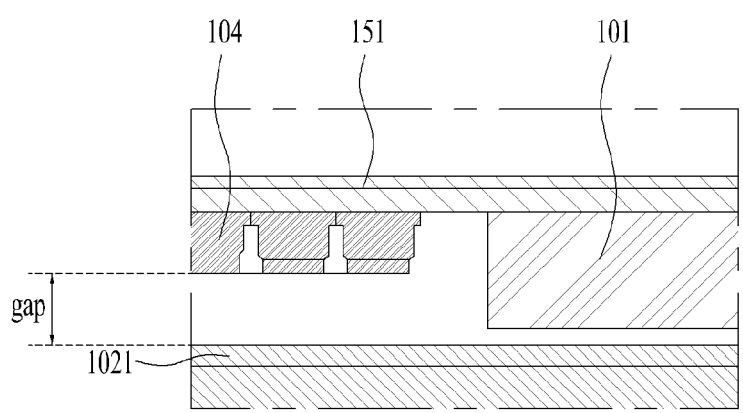
Figure 13:
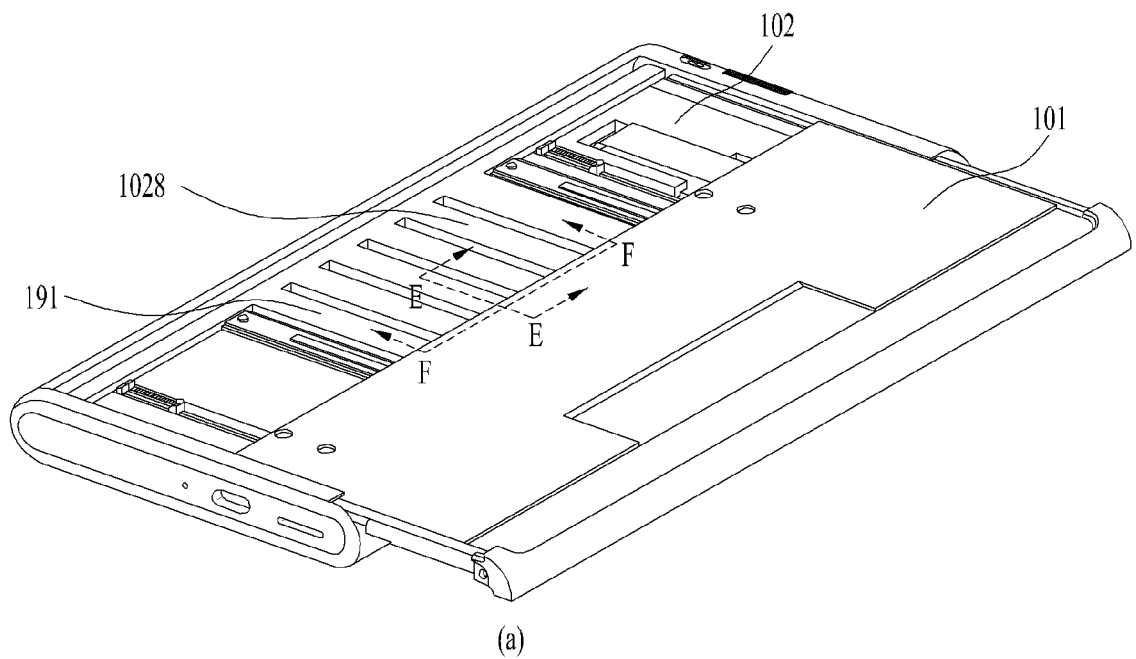
Figure 13:
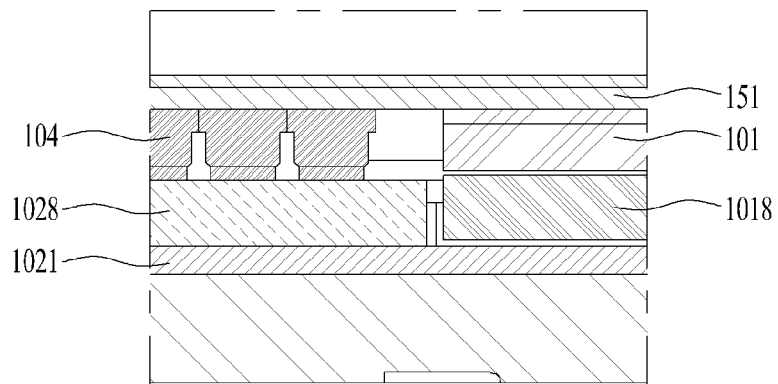
Figure 13:
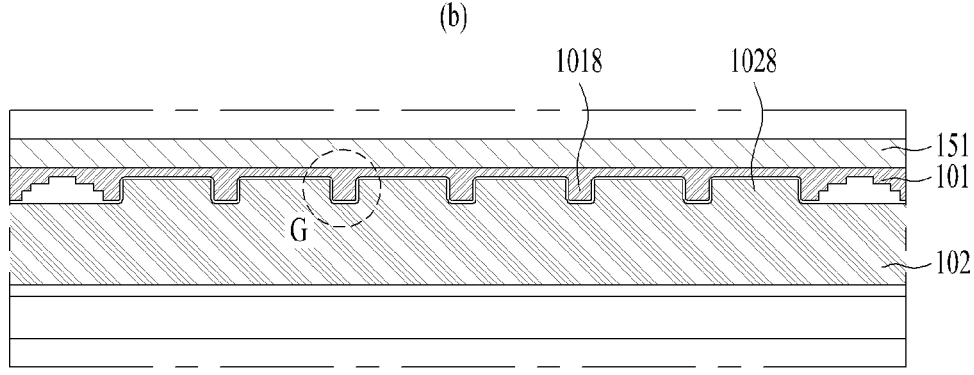

FIGS. 12 and 13 are views showing the first frame 101 and the second frame 102 at the second state of the mobile terminal 100. FIG. 12(*a*) and FIG. 13(*a*) are views showing that the display unit 151 is omitted. FIG. 12(*b*) and FIG. 13(*b*) are sections of D-D in FIG. 12(*a*) and E-E in FIG. 13(*a*). FIG. 13(*c*) is a section of F-F in FIG. 13(*a*).

Referring to FIG. 10, the first frame 101 has a plate shape without an inner space, and the first frame 101 should support the first area at the second state. If the thickness of the first frame 101 is too thin, since the first frame 101 is vulnerable to rigidity at the second state, the first frame 101 needs to have rigidity of a certain size or more.

If the thickness of the first frame 101 is thick, as shown in FIG. 12(*b*), a thickness gap occurs between the rolling hinge 104 and the first frame 101. Sagging occurs in the second area 151*b* due to the thickness gap, whereby boundary between the first area 151*a* and the second area 151*b* of the display unit 151 may be remarkable.

If the rolling hinge 104 is formed thickly to correspond to the thickness of the first frame 101, a curvature radius should be increased at the portion where the rolling hinge is bent to surround the second frame 102. If the curvature radius of the rolling hinge 104 is increased, a problem occurs in that the thickness of the mobile terminal 100 becomes thick.

Therefore, the rolling hinge 104 needs to be configured so as not to generate a gap between the front portion of the second frame 102 and the rolling hinge 104 while making sure of rigidity of the first frame 101. A reinforcing rib 1018 protruded from the rear surface of the first frame 101 and supports 1028 protruded from the front surface of the second frame 102 are shown. The reinforcing rib 1018 is disposed on the rear surface of the first frame 101 such that a plurality of reinforcing ribs are spaced apart from one another in the third direction, wherein each reinforcing rib 1018 is longitudinally extended in the first direction. The reinforcing rib 1018 may make sure of rigidity of a predetermined size or more even though the whole thickness of the first frame 101 is not thick.

The supports 1028 are located among the plurality of reinforcing ribs 1018, and are disposed so as not to overlap the reinforcing ribs 1018 in the first direction. As shown in FIG. 13(*c*), the supports 1028 may be formed to fully fill the spaces among the reinforcing ribs 1018, and a gap space may be provided between the reinforcing rib 1018 and the support 1028 in the third direction. Since the reinforcing ribs 1018 are not overlapped with the supports 1028 in the first direction, the reinforcing ribs 1018 and the supports 1028 do not disturb movement of the first frame 101.

A thickness direction height in the thickness direction of the supports 1028 may be formed to correspond to that of the reinforcing rib 1028. The supports 1028 may support the rear surface of the rolling hinge 104 to remove a gap between the rolling hinge 104 and the front portion of the second frame 102, whereby the second area may stably be supported even at the second state without sagging in the rear direction.

Figure 14:
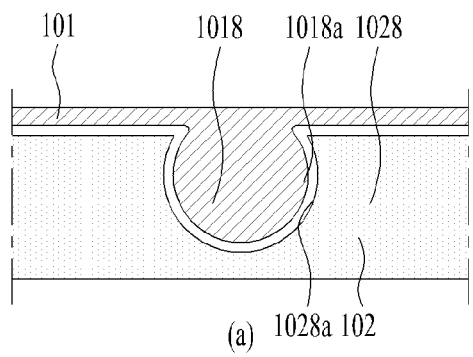
FIG. 14 is a view showing a section of a third direction of a reinforcing rib and a support in FIG. 13.
Figure 14:
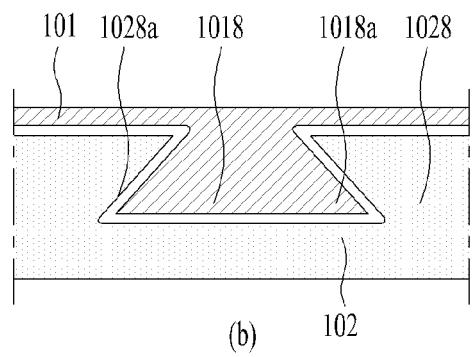
Figure 14:
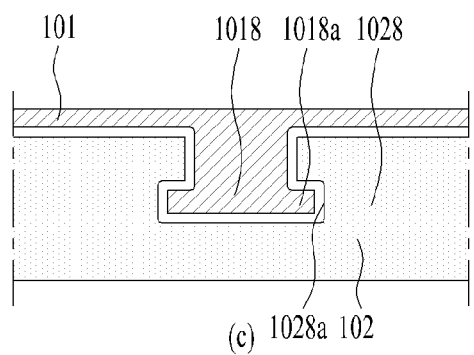
Figure 14:
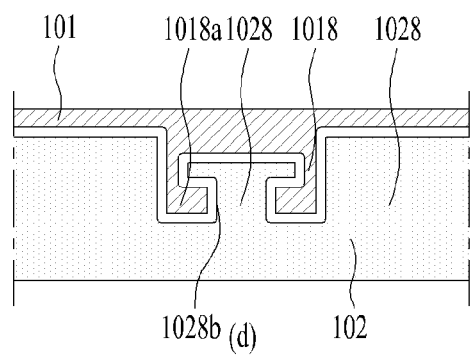

FIG. 14 is an enlarged view of a portion G of FIG. 13(*c*), and relates to an embodiment of a third direction section of the reinforcing rib 1018 and the support 1028 in FIG. 13. When first frame 101 slidably moves by using the reinforcing rib 1018 and the support 1028, distortion may be avoided and the linear guide 230 may be implemented. In order to perform the function of the linear guide 230 by using the reinforcing rib 1018 and the support 1028, as shown in FIG. 14, the shape of the support 1028 may be configured to surround the reinforcing rib 1018 at both sides in the third direction.

The reinforcing rib 1018 may further include rib protrusion 1018*a* protruded in the third direction, and the support 1028 may include a rib groove 1028*a* corresponding to the rib protrusion of the reinforcing rib 1018. The rib protrusion 1018*a* and the rib groove 1028*a* may have sections of uneven shapes engaged with each other, and may be extended in the first direction to guide movement of the first frame 101 in the first and second directions and limit movement of the first frame 101 in the third direction, whereby distortion may be prevented from occurring. The section in the third direction of the reinforcing rib 1018 may be a rectangular shaped section as shown in FIG. 13(*c*) but may be a circular shaped section or trapezoidal section in which the rib protrusion 1018*a* is formed as shown in FIG. 14(*a*). The rib groove 1028*a* may have a concave shape corresponding to the rib protrusion 1018*a*.

As shown in FIG. 14(*c*), the rib protrusion 1018*a* may have an uneven shape protruded from the end in the thickness direction of the reinforcing rib 1018 in the third direction. As shown in FIG. 14(*d*), a plurality of reinforcing ribs 1018 and a plurality of supports 1028 include a plurality of uneven patterns protruded or inserted in the third direction to prevent the first frame from moving in the third direction or prevent a gap of the first frame from occurring in the thickness direction.

If a width of the section of the rib protrusion 1018a is increased or bent as the rib protrusion 1018a is spaced apart from the rear surface of the first frame 101, the first frame 101 and the second frame 102 may be prevented from being detached from each other in the thickness direction of the mobile terminal, whereby distortion in the third direction may be prevented from occurring and fastening between the first frame 101 and the second frame 102 may be enhanced.

As described above, the mobile terminal of the present disclosure may enhance usability and portability by varying its size.

Also, since the curved portion of the flexible display unit 151 is not limited to a specific portion, stress only applied to the specific portion may be distributed when a size of the mobile terminal is changed.

Also, since the display unit 151 may stably be maintained at a flat state even in the case that mobile terminal 100 is extended, a continuous large screen may be implemented in an extended state.

Also, since the mobile terminal may naturally be slid without distortion, the mobile terminal may be prevented from being damaged or disordered in the middle of being used.

Also, the rack gear 205 may be prevented from being exposed to the outside in a state that the rack gear 205 is extended, whereby a contaminant may be prevented from entering the mobile terminal and durability may be improved.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds, are therefore intended to be embraced by the appended claims.

What is claimed is:

1. A mobile terminal comprising:
a body including a first frame and a second frame slidably coupled to a rear surface of the first frame with respect to a first direction or a second direction;
a flexible display including a first area coupled to a front surface of the first frame, and a second area having a position that varies with respect to a front surface or a rear surface of the body when a size of the body is changed,
wherein a rolling hinge is located at a rear surface of the second area and configured to enable a bending deformation corresponding to a shape of the second area;
a plurality of reinforcing ribs protruding from the rear surface of the first frame and extending along the first direction; and
a plurality of supports protruding from a front surface of the second frame and located between respective reinforcing ribs of the plurality of reinforcing ribs,
wherein a thickness of the rolling hinge and a thickness of the plurality of supports correspond, respectively, to a thickness of the first frame and a thickness of the plurality of reinforcing ribs.

2. The mobile terminal of claim 1, wherein each of the plurality of supports has a protruding height corresponding to a protruding height of a corresponding reinforcing rib of the plurality of reinforcing ribs.

3. The mobile terminal of claim 1, wherein:
each of the plurality of reinforcing ribs includes a rib protrusion protruding along a third direction perpendicular to the first direction;
each of the plurality of supports has a rib groove corresponding to a shape of the rib protrusion of a corresponding reinforcing rib of the plurality of reinforcing ribs; and
the rib protrusion of each of the plurality of reinforcing ribs and the rib groove of each of the plurality of supports are configured to guide movement of the first frame along the first direction and the second direction with respect to the second frame and limit movement of the first frame along the third direction.

4. The mobile terminal of claim 3, wherein:
the rib protrusion of each of the plurality of reinforcing ribs includes a low friction layer on a surface thereof; and
the rib groove of each of the plurality of supports includes a low friction layer on a surface thereof.

5. The mobile terminal of claim 1, wherein the rolling hinge includes a plurality of support bars extending along a third direction perpendicular to the first direction and disposed in parallel with one another along the first direction, and wherein an interval between support bars of the plurality of support bars is widened as the support bars are moved further away from a rear of the flexible display.

6. The mobile terminal of claim 1, further comprising a driver configured to move the first frame along the first direction or the second direction with respect to the second frame to adjust a size of the body,
wherein the driver includes:
a motor packaged in the second frame;
a pinion gear rotatable by a driving force of the motor; and
a rack gear located at the rear surface of the first frame and extending along the first direction, the rack gear configured to move linearly by the driving force of the motor, which is delivered through the pinion gear.

7. The mobile terminal of claim 6, further comprising:
a motor housing fastened to the second frame and configured to seat the motor and the pinion gear thereon; and
a guide rail fastened to the rack gear and configured to guide the linear movement of the rack gear.

8. The mobile terminal of claim 7, further comprising a rail bearing located between the guide rail and the rack gear.

9. The mobile terminal of claim 6, wherein the driver further includes:
a plurality of motors disposed in parallel with one another along the first direction; and
a plurality of pinion gears fastened to the plurality of motors, and configured to deliver the driving force to the rack gear.

10. The mobile terminal of claim 6, wherein the driver further includes a plurality of drivers disposed to be spaced apart from one another with respect to a third direction perpendicular to the first direction.

11. The mobile terminal of claim 1, further comprising a slide frame slidably coupled to a rear surface of the second frame with respect to the first direction or the second direction, wherein an end portion of the flexible display is fixed to a rear surface of the slide frame.

12. The mobile terminal of claim 11, further comprising a first edge deco fixing the end portion of the flexible display to the first frame.

13. The mobile terminal of claim 1,
wherein the second area includes a side portion surrounding a side of the body, and
wherein the mobile terminal further comprises a side frame configured to protect the side portion of the flexible display.

14. The mobile terminal of claim 1, further comprising a rear cover covering a rear surface of the second frame, the rear cover including a light-transmissive material.

15. A mobile terminal comprising:
a body including a first frame and a second frame slidably coupled to a rear surface of the first frame with respect to a first direction or a second direction;
a flexible display including a first area coupled to a front surface of the first frame, and a second area having a position that varies with respect to a front surface or a rear surface of the body when a size of the body is changed;
a plurality of reinforcing ribs protruding from the rear surface of the first frame and extending along the first direction;
a plurality of supports protruding from a front surface of the second frame and located between respective reinforcing ribs of the plurality of reinforcing ribs; and
a driver configured to move the first frame along the first direction or the second direction with respect to the second frame to adjust the size of the body,
wherein the driver includes:
a motor housing fastened to the second frame;
a motor packaged in the motor housing;
a pinion gear packaged in the motor housing and rotatable by a driving force of the motor;
a rack gear located at the first frame and extending along the first direction, the rack gear configured to move linearly by the driving force of the motor, which is delivered through the pinion gear; and
a rack gear guide formed at the motor housing and configured to guide the linear movement of the rack gear.

16. The mobile terminal of claim 15, further comprising a rail bearing located between the rack gear guide and the rack gear.

17. The mobile terminal of claim 15, wherein the driver further includes a plurality of drivers disposed to be spaced apart from one another with respect to a third direction perpendicular to the first direction.

18. A mobile terminal comprising:
a body including a first frame and a second frame slidably coupled to a rear surface of the first frame with respect to a first direction or a second direction;
a flexible display including a first area coupled to a front surface of the first frame, and a second area having a position that varies with respect to a front surface or a rear surface of the body when a size of the body is changed;
a plurality of reinforcing ribs protruding from the rear surface of the first frame and extending along the first direction;
a plurality of supports protruding from a front surface of the second frame and located between respective reinforcing ribs of the plurality of reinforcing ribs; and
a driver configured to move the first frame along the first direction or the second direction with respect to the second frame to adjust the size of the body,
wherein the driver includes:
a plurality of motors packaged in the second frame and disposed in parallel with one another along the first direction;
a rack gear located at the first frame and extending along the first direction; and
a plurality of pinion gears fastened to the plurality of motors, and configured to deliver a driving force to the rack gear.

19. The mobile terminal of claim 18, further comprising:
a motor housing fastened to the second frame and configured to seat the plurality of motors and the plurality of pinion gears thereon; and
a guide rail fastened to the rack gear and configured to guide a linear movement of the rack gear.

* * * * *